United States Patent [19]
Whetsel

[11] Patent Number: 5,595,283
[45] Date of Patent: Jan. 21, 1997

[54] MODULAR FLEXIBLE CONVEYOR

[75] Inventor: Larry E. Whetsel, Stow, Ohio

[73] Assignee: Axia Incorporated, Oak Brook, Ill.

[21] Appl. No.: 386,968

[22] Filed: Feb. 10, 1995

Related U.S. Application Data

[63] Continuation-in-part of Ser. No. 188,362, Jan. 27, 1994, Pat. No. 5,456,348, which is a continuation-in-part of Ser. No. 14,124, Feb. 5, 1993, abandoned.

[51] Int. Cl.$^6$ ................................................. B65G 21/14
[52] U.S. Cl. ........................................ 198/812; 193/35 F
[58] Field of Search ................................. 198/594, 812, 198/860.1, 860.2, 861.1, 861.2; 193/35 F

[56] References Cited

U.S. PATENT DOCUMENTS

| | | | |
|---|---|---|---|
| 2,576,217 | 11/1951 | Eggleston | 198/812 X |
| 2,678,125 | 5/1954 | Bonney, Jr. | 198/812 |
| 2,863,553 | 12/1958 | Nordquist | 198/812 X |
| 3,584,731 | 6/1971 | Dahlem | 198/861.2 X |
| 4,260,053 | 4/1981 | Onodera | 198/812 |
| 4,830,166 | 5/1989 | Ottosson | 193/35 F X |
| 5,131,531 | 7/1992 | Chambers | 198/860.2 |

FOREIGN PATENT DOCUMENTS

| | | | |
|---|---|---|---|
| 9008717 | 8/1990 | WIPO | 198/861.2 |

OTHER PUBLICATIONS

Flexiveyor Flexible Conveyor, Machine & Production Engineering, vol. 120, No. 3108 (07 Jun. 1972).

*Primary Examiner*—James R. Bidwell
*Attorney, Agent, or Firm*—Laff, Whitesel, Conte & Saret, Ltd.

[57] ABSTRACT

A modularly constructed, flexible, expandable conveyor comprises a pair of flexible, expandable X-shaped link assemblies, preferably in the form of a plurality of links pivotally connected to each other in order to form an X-shaped chain. Each X-shaped chain terminates in an end plate having mating bolt holes therein so that successive chains may be joined by passing bolts through the mating bolt holes in overlapped end plates. Then, knurled hand knobs are turned onto the bolts to clamp together the overlapped end plates. The end plates enable the X-shaped chain in any given module to expand or collapse independently of the X-shaped chains in other modules. The conveyor surface preferably includes a field of skate wheels mounted on rods extending between the link assemblies, at spaced locations along the length of the conveyor. The conveyor is sufficiently flexible to be able to form a curved conveyor surface.

8 Claims, 15 Drawing Sheets

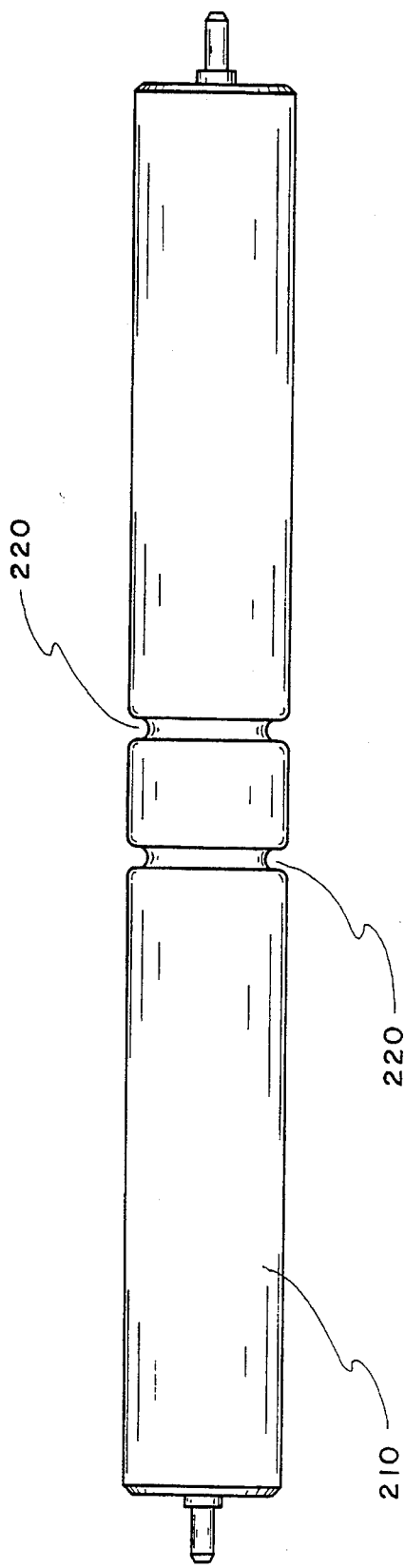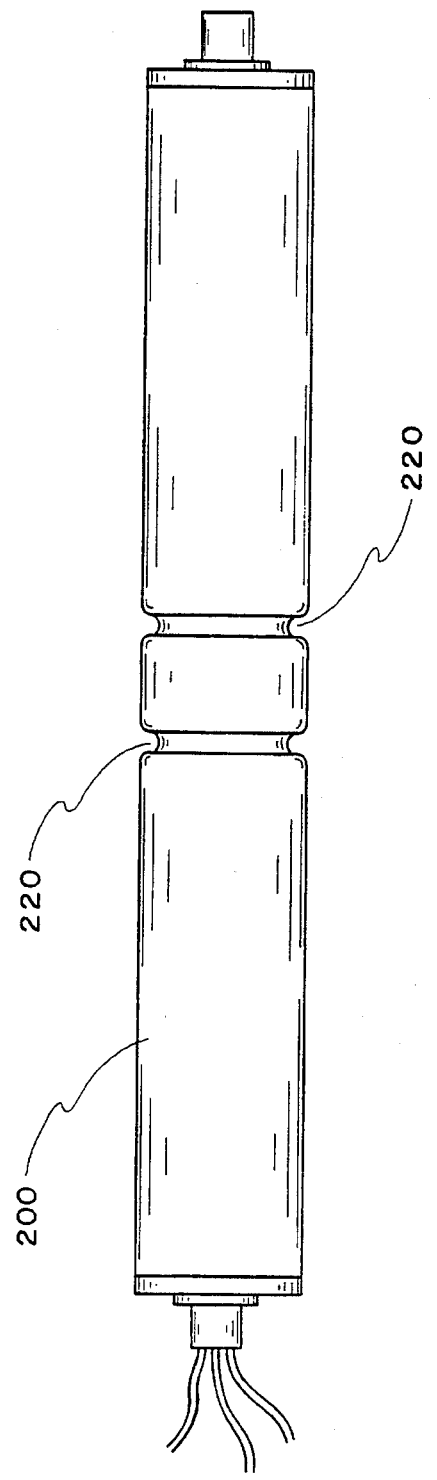

MODULAR FLEXIBLE CONVEYOR

This is a continuation-in-part application of U.S. patent application Ser. No. 08/188,362 filed Jan. 27, 1994, U.S. Pat. No. 5,456,348, which in turn was a continuation-in-part of Ser. No. 08/014,124 filed Feb. 5, 1993, now abandoned.

The present invention relates to conveyors for handling and transporting products and other materials and to flexible and expandable conveyors having powered rollers and, more particularly, to quick connect/disconnect features for conveyors which must be assembled and disassembled in the field.

BACKGROUND

Known conveyors are used for transporting objects, such as boxes. Generally such conveyors are non-powered devices comprising plurality of rods having freely turning rollers or skate wheels, which define a path or surface for movement of the objects, and a support structure, which enables the length and curvature of the conveyor to be selectively varied. The conveyors can be used to transport objects both horizontally and up and down inclines. Some conveyors are supported by a plurality of legs having wheels or casters to provide portability.

Attempts have been made to power the conveyors in order to provide a more effective transporting system. Some conveyors having fixed lengths and linear paths employ individually powered rollers. However, these conveyors have limited utility because the distance and path needed to transport materials frequently varies from job to job. Powered conveyors having flexible lengths and paths are more useful, but flexible powered conveyors have not been entirely successful. For example, some flexible powered conveyors use rollers which are rotatably driven by O-ring or chain drive systems which connect multiple rollers together to multiple external power sources, such as motors mounted on legs of the conveyor.

Regardless of whether powered or non-powered, a problem occurs when the conveyor must be transported, assembled, or disassembled in the field. The conveyors may become very long and difficult to assemble in the field. Therefore, the manufacturer may make the conveyor in modular sections which are joined or separated in the field. This need for modular construction leads to a need for a connector which facilitates quickly joining or separating the conveyor sections.

Heretofore, it was necessary to partly disassemble and then reassemble the ends of the adjoining conveyors in order to join them. This meant pulling rods, with the spacers and skate wheels coming off the ends of the rods as they were pulled, and then rethreading the rods through new brackets joining the two conveyors, rethreading the skate wheels and spacers on the rods in the process. This was both time consuming and frustrating since the pattern of wheel positions was sometimes difficult to reestablish.

Yet another problem centered upon movement of the conveyor after it is installed. For example, when trucks back up to a loading dock, a conveyor is extended into the back of the truck. From there, the conveyor might follow any path, say, a somewhat S-shaped path to a receiving area. When the truck is ready to move away, the conveyor is pushed out of the back of the truck and away from the dock edge, far enough to allow a new truck to back up to the dock. Then the conveyor is pushed into the back of the new truck.

Heretofore, all of the conveyors moved as a unit. Therefore, it was necessary to readjust the S-shaped path each time that the conveyor was pushed into or out of the back of the truck. Of course, the example of a truck at the dock is only to illustrate the problem. The same problem often occurred whenever the prior art conveyor is pushed because an expansion or collapse of any part of the conveyor had an effect throughout the entire length of the conveyor.

With the invention, any part of the conveyor may be locked into position by a foot operated brake at the castors on the bottoms of the legs supporting the conveyor. Then one section of the conveyor may be stretched as it is pushed into the back of the truck, or compressed as it is pushed out of the back of the truck. There is no effect upon the rest of the conveyor which is held stationary by the foot operated brake.

SUMMARY

Accordingly, an object of this invention is to provide a flexible, expandable conveyor having wheels or rollers so that boxes or other objects may be pushed or propelled over the conveyor. In particular, an object is to provide such conveyors which may have a modular construction so that the conveyor may be carried to the field in sections which are there assembled or disassembled quickly and easily. Here, an object is to provide quick connect or disconnect connectors for the modules or any similar conveyors.

A further object is to provide conveyors which can easily flex into horseshoe or other sharp curves, expand, and contract without complication from the drive mechanism or electrical system.

In this connection, an object of the invention is to lock one or more modular sections of the conveyor in place, while other modular sections of the conveyor are being moved.

In accordance with these and other objects, a flexible, expandable modular conveyor comprises two or more spaced flexible, expandable link assemblies. Steel, plastic or nylon skate wheels may be combined with rollers to form a field of rotatable conveyance devices. A quick connect/disconnect mechanism is provided at the junction where two modular link assemblies are joined together. Each modular section is able to expand or to contract independently of the other modular conveyor sections so that the position of any one or more of the modules may be adjusted without causing any change in the other modules.

If provided, the powered roller is rotatably mounted between the link assemblies at spaced locations along the length of the conveyor. At least one of the powered rollers is rotatably driven by a motor and gear box which is housed inside the roller. In one embodiment, each powered roller is connected electrically, but not mechanically, to each other powered roller. In another embodiment, one powered roller is connected by O-rings to one or more driven rollers, so that the powered roller drives the driven rollers.

BRIEF DESCRIPTION OF THE DRAWINGS

The present invention and advantages thereof will become more apparent upon consideration of the following detailed description when taken in conjunction with the accompanying drawings:

FIG. 12 is a plan view of a grooved driven roller used in a second embodiment;

FIG. 13 is a plan view of a grooved powered roller used in the second embodiment;

DETAILED DESCRIPTION OF THE PREFERRED EMBODIMENTS

Figure 1A:
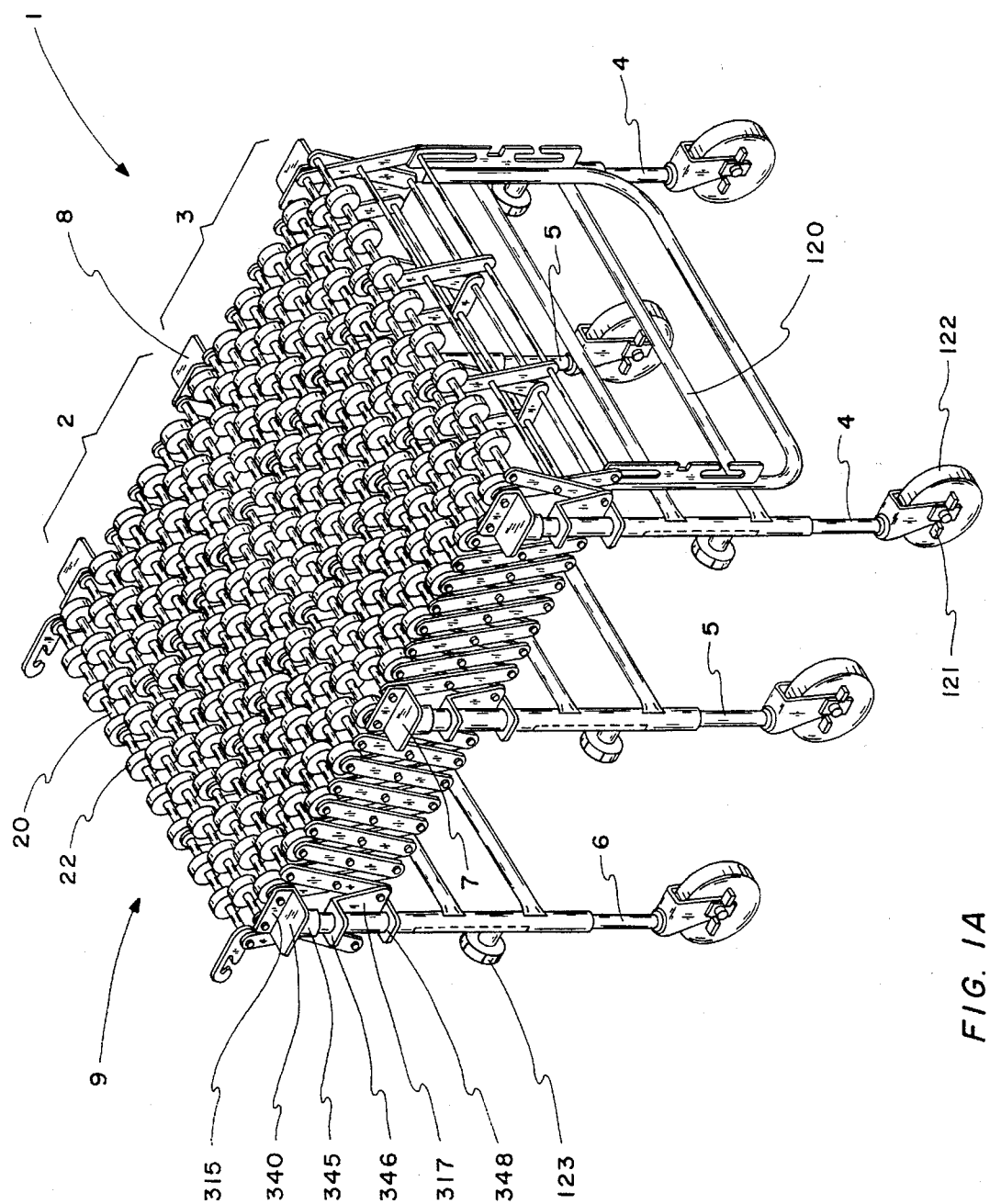
FIG. 1A is a perspective view of a non-powered conveyor which is the most common environment in which the invention might be used.

FIG. 1A shows a non-powered conveyor 1, which is the most likely kind of conveyor to use the invention. This conveyor is here shown as comprising two modular sections 2, 3 which, according to the invention are individually expandable. Each conveyor is supported by two pair of legs 4–6. The two sections may be joined in the field by means of the inventive quick connect/disconnect 7, 8. When joined, a field of freely turning skate wheels 9 provide an unpowered means over which boxes or the like may be pushed as, for example, when a truck is being loaded or unloaded.

Figure 1B:
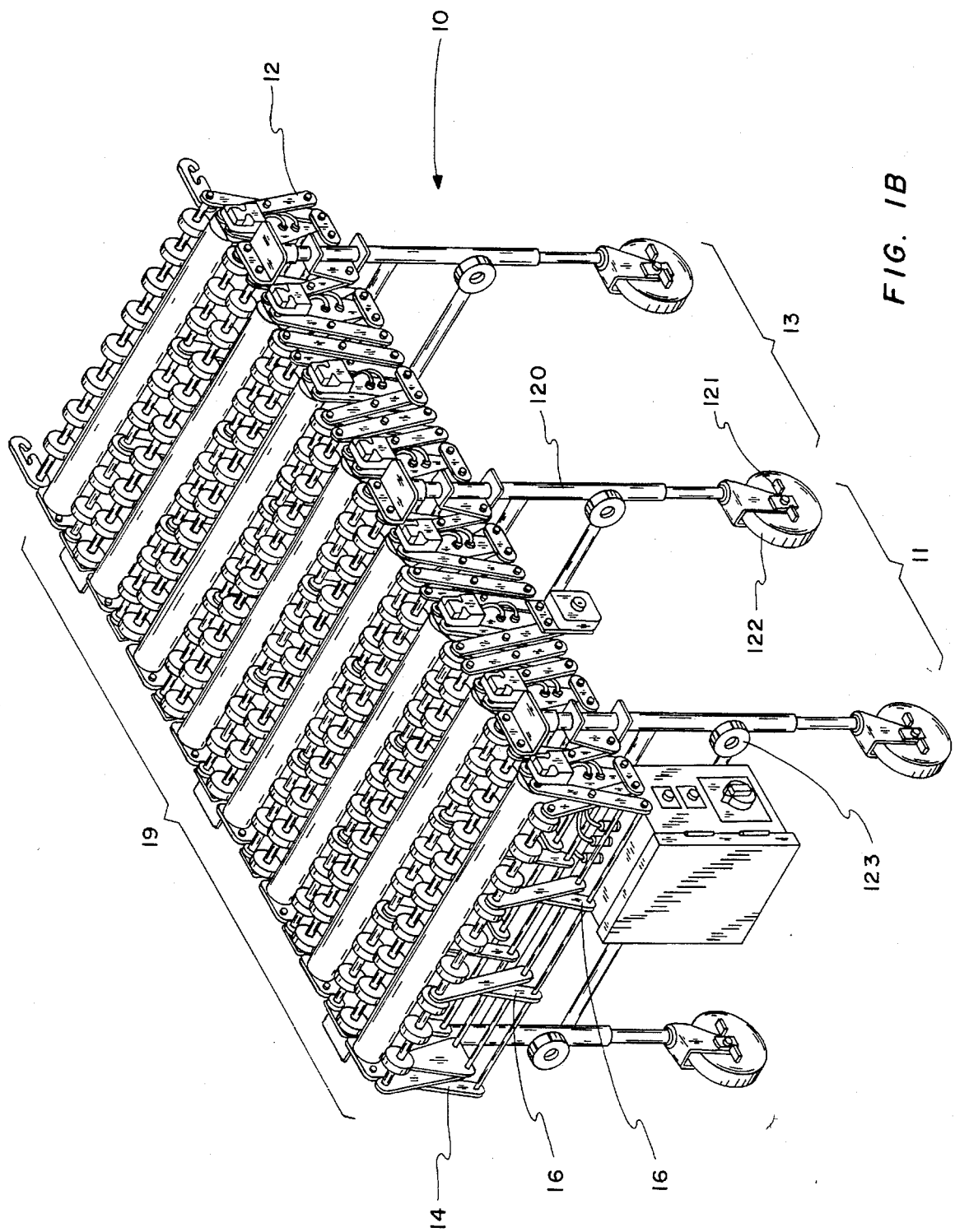
FIG. 1B is a perspective view taken from patent application Ser. No. 08/188362 and illustrating how the invention might be used in connection with a powered conveyor here show in a contracted and linear configuration.
Figure 2:
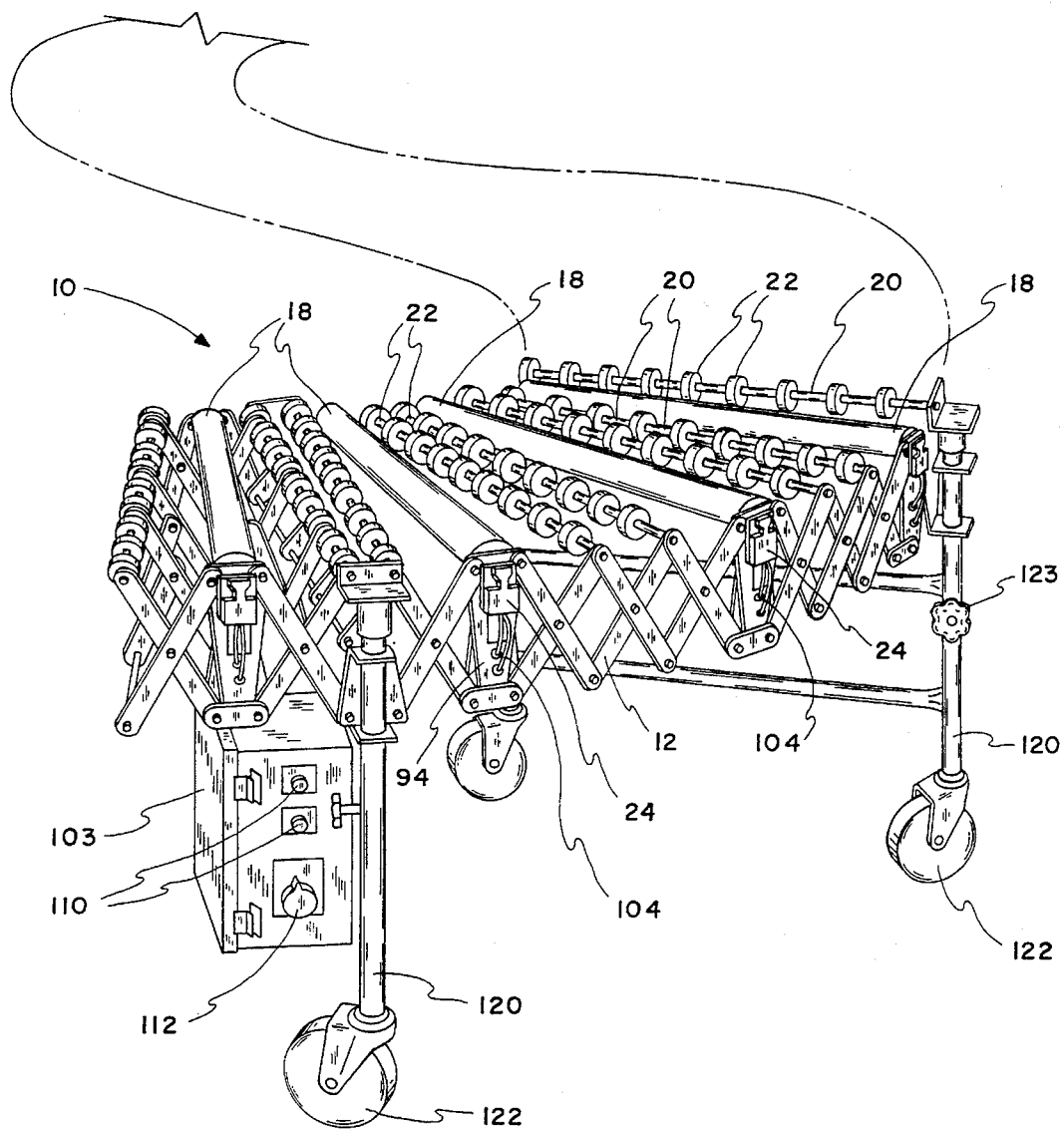
FIG. 2 is a perspective view of one bed section of a conveyor in an expanded and curved configuration.

FIGS. 1B, 2 show a modified conveyor 10 which includes one or more connected modular bed sections 11, 13, which in turn are each formed from a plurality of link assemblies, leg assemblies, rollers, and skate wheels. This powered version is not so common as the unpowered version in FIG. 1A; however, when required, the powered version is important.

Figure 3:
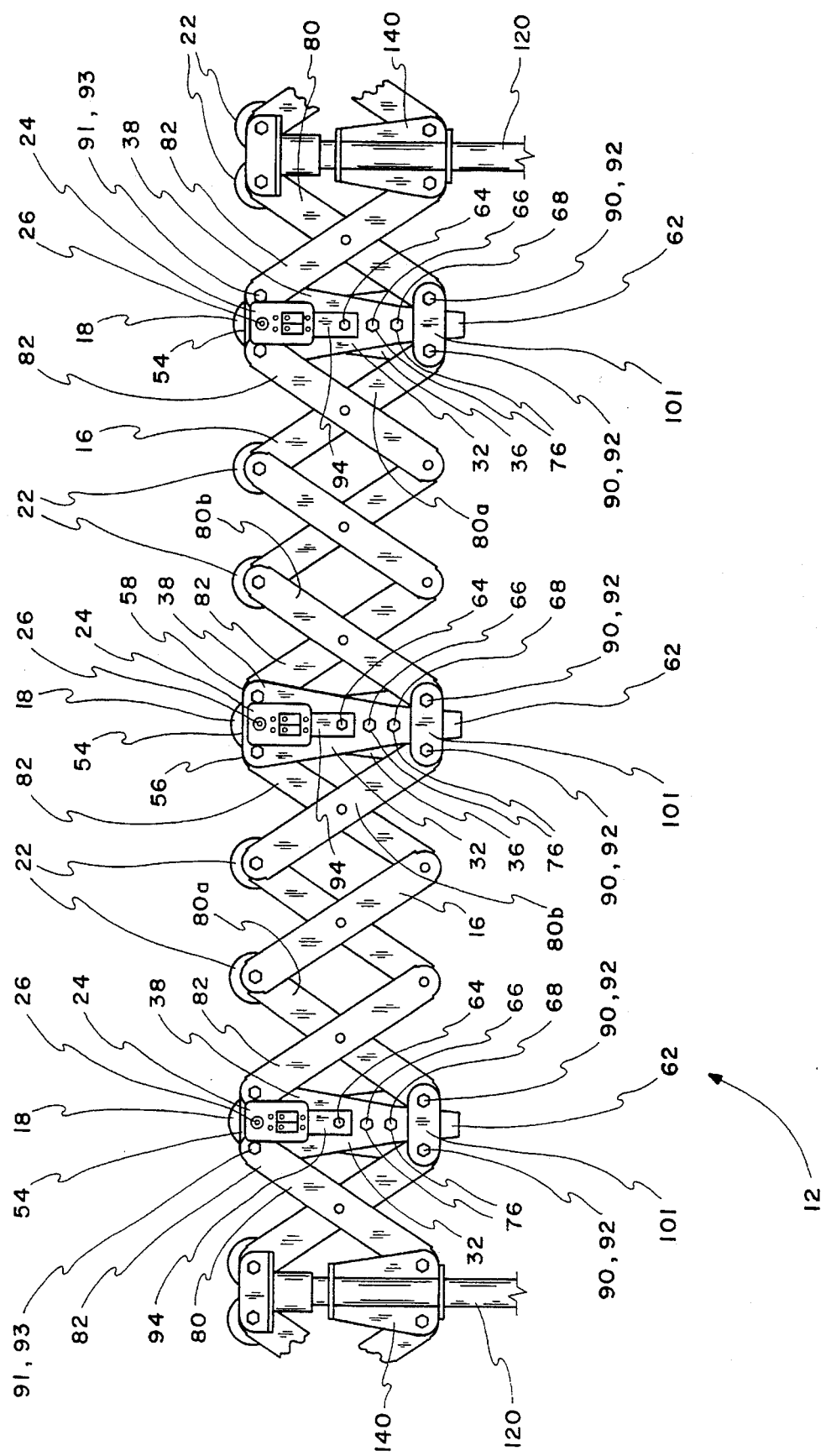
FIG. 3 is a side view showing a part of a side link assembly of a conveyor, in an extended position.
Figure 4:
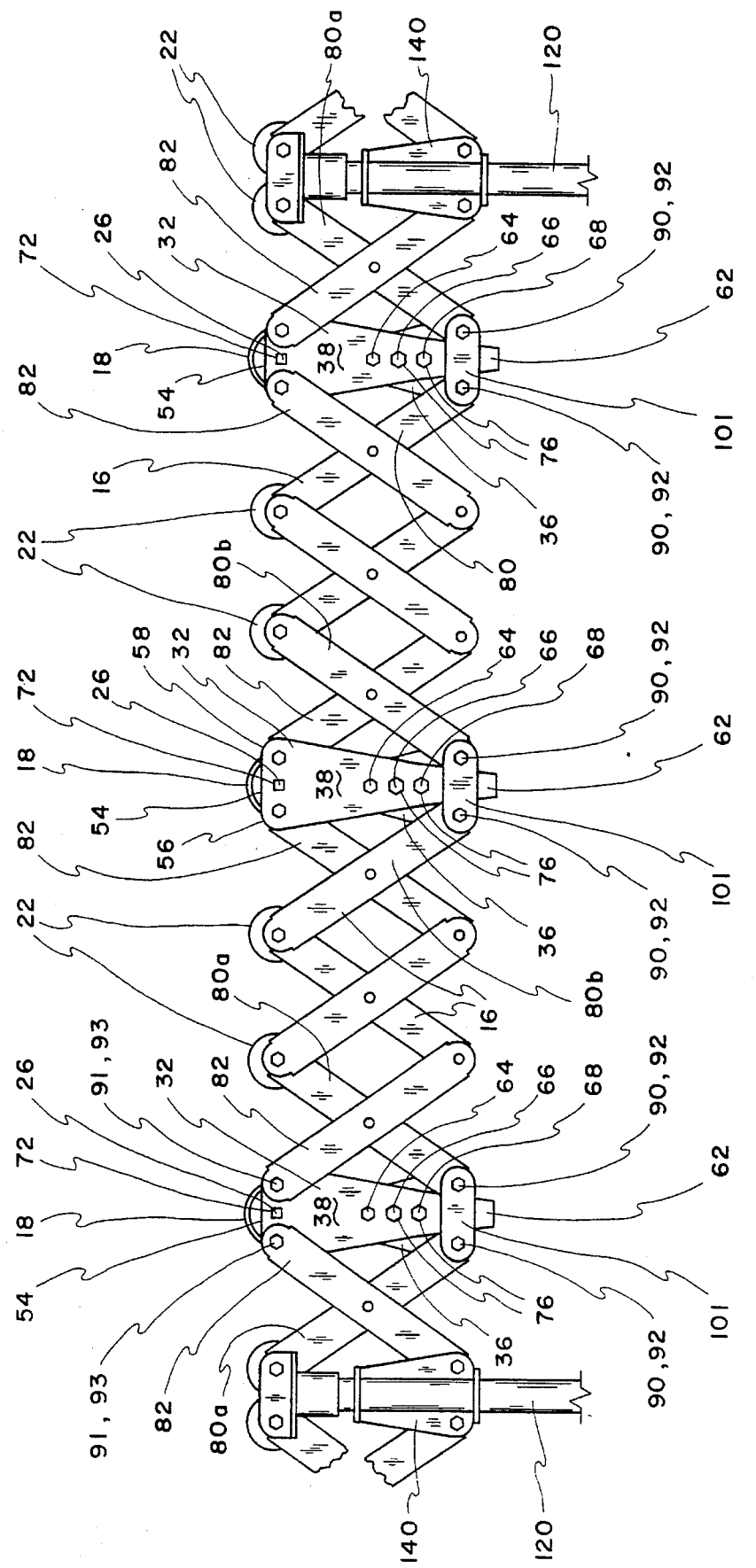
FIG. 4 is a side view showing a part of the opposite side link assembly of a conveyor, in an extended position.

The link assemblies, best shown in FIGS. 3, 4, include two parallel, spaced side link assemblies 12, 14 extending along the right and left sides of the conveyor. One or more inner link assemblies 16 (FIG. 8) may also be included, each inner link assembly extending between and parallel to the side link assemblies 12, 14. The link assemblies include a plurality of full links 80 and, in the case of an inner link assembly, half links 81 pivotally connected to each other in a series of "X" shaped chains extending over substantially the length of the conveyor. For example, a conveyor module may have eight X-shaped full links per bed. When the link assemblies are extended linearly, as in FIGS. 3 and 4, one half of the links, such as 80a, are in generally the same plane, while the other half of the links 80b (those that lie across links 80a), are in a spaced parallel plane. The links are pivotally joined at the centers and at the ends of the X-shaped links so that the links may be extended or contracted. In this manner, the links smoothly and closely compress when the conveyor is contracted.

The side link assemblies 12, 14 further include a plurality of inner power roller links 36 and outer power roller links 38 (FIGS. 5–7), spaced at multiple locations along the length of the conveyor where powered rollers are also to be located. The inner power roller link 36 is a truncated triangular element having a base 40, an apex 42, four rounded corners 44–47, and an elongated slot 50 formed in face of the inner link 36. A pair of apertures 52, 52 are formed in the base corners 44, 45.

The outer power roller link 38 (FIG. 6) is also generally triangular but inverted, having a base 54 with two rounded corners, 56, 58, an apex 60, and a tongue 62 that extends downwardly from the apex 60. A plurality of holes 64, 66, 68 are formed in the face of the outer link 38, and a plurality of apertures 70, 72, 74 are formed along the base 54 of the outer link 38. The lengths of the bases 40 and 54 of the inner and outer power roller links 36, 38 preferably are approximately equal.

Figure 7:
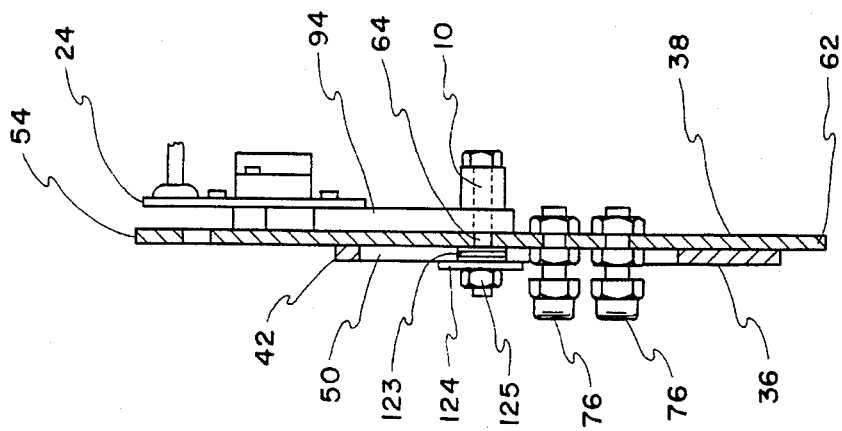
FIG. 7 is a cross section of a power roller link assembly taken along the lines 7—7 of FIG. 5.
Figure 6:
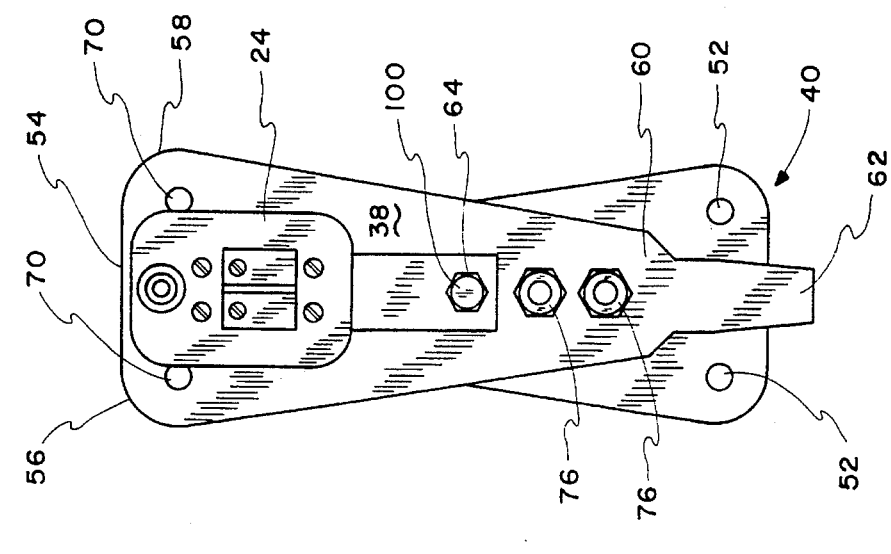
FIG. 6 is a vertical elevation of the front side of a power roller link assembly of the invention, with a terminal block secured thereto.
Figure 5:
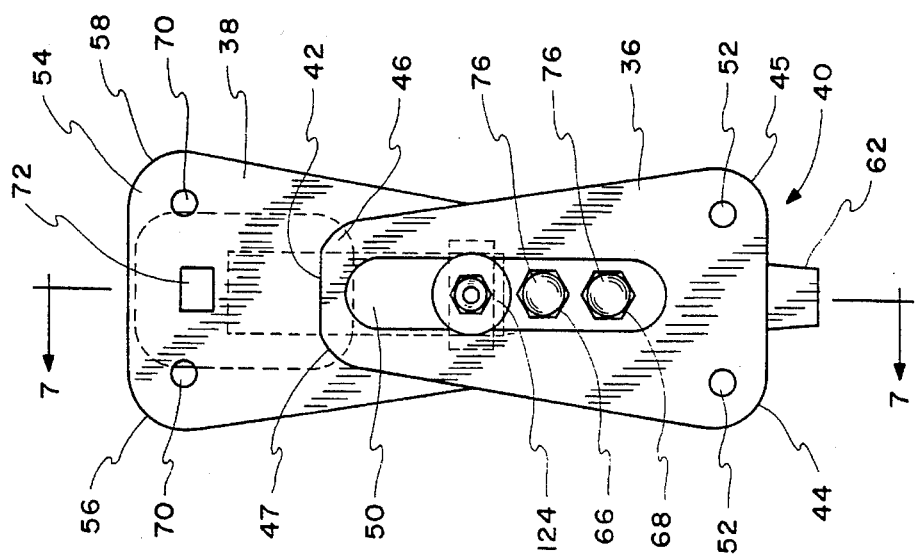
FIG. 5 is a vertical elevation of the rear side of a power roller link assembly such as might be used in FIG. 1B of the invention with the terminal block shown in phantom lines.
Figure 9:
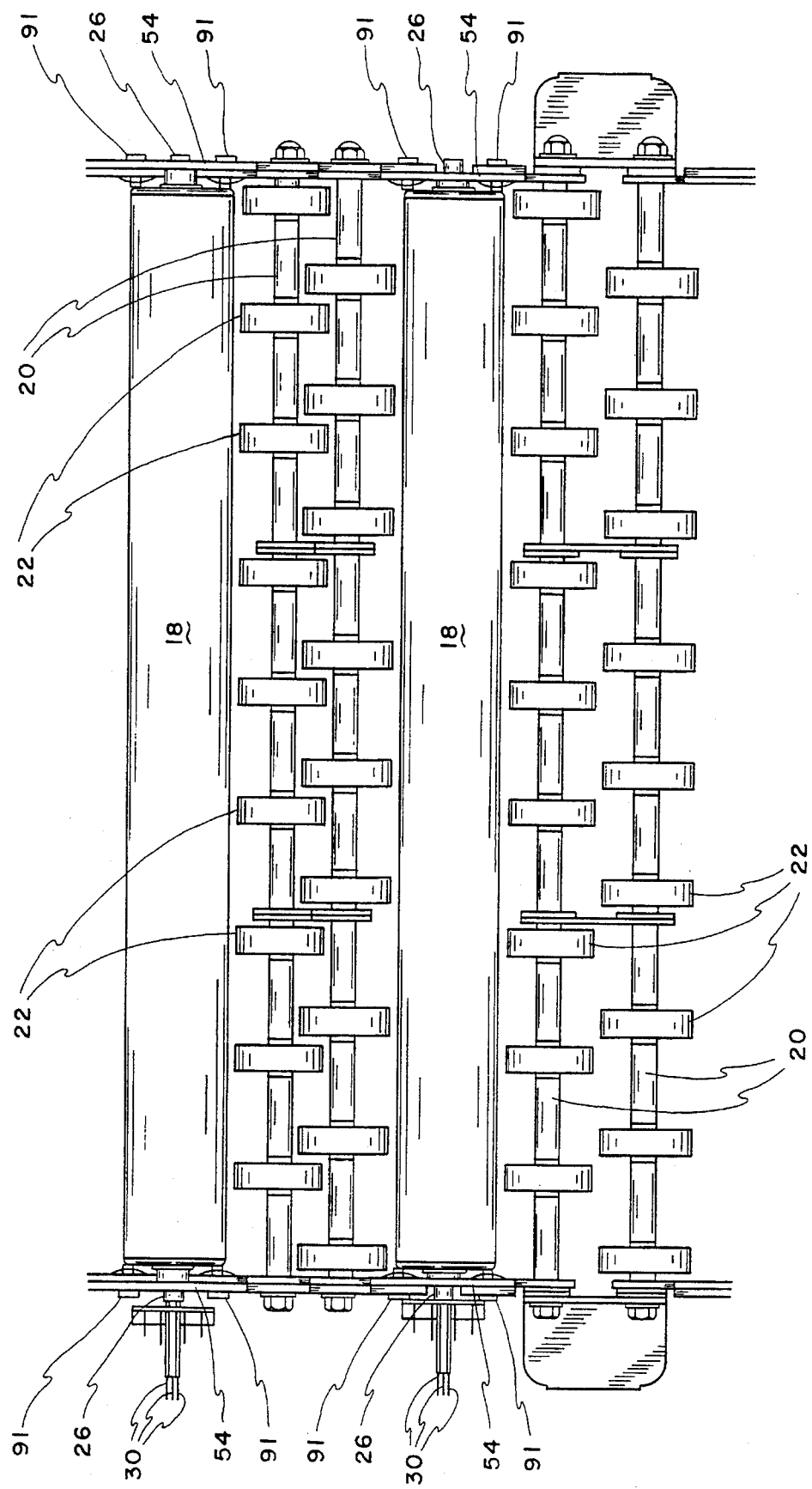
FIG. 9 is a top plan view, schematic in nature, of part of the conveyor bed.

As shown best in FIGS. 5–7, one inner and one outer power roller link 36, 38 are fastened together so that their apexes 42, 60 extend in opposite directions. A pair of fittings 76 for electrical wires extend through the elongated slot 50 formed in the inner power roller link 36 and holes 66, 68 formed in the outer power roller link 38. The inner power roller links 36 and outer power roller links 38 are fastened to the ends of full links 80 by pivot bolts 90 or the like that extend through apertures 92 formed in the full links 80, apertures 70 of the outer power roller link 38, apertures 52 of the inner power roller link 36, and apertures in a side link support plate 101 that joins two full links 80 across tongue 62. The tongue 62 is entrapped between the inner power roller link 36, two full links 80, and a side link support plate 101 allowing the conveyor to extend and contract while maintaining the conveyor surface 19 horizontal.

The relative vertical positions of the inner and outer power roller links can be adjusted. Three washers 123 or similar spacers are trapped between the outer power roller link 38 and a washer 124 by a bolt 100 and a nut 125 connecting the inner and outer power roller links (see FIGS. 5–7). The three washers 123 have a total thickness which is slightly greater than the thickness of the inner link 36, and they have diameters which are less than the width of slot 50. Washer 124 preferably has a diameter greater than the width of slot 50. With this construction, the outer power roller links 38 remain fixed at a selected vertical position with said rollers and the bases 54 of the outer power roller links 38 remain co-planar with the rest of conveyor bed 19.

Inner power roller links 36 adjust or slide vertically along slot 50, depending on the degree of extension of the link assemblies and conveyor. The lateral position of inner and outer power roller links is arranged so that the inner power roller links are generally co-planar with one half of the links 80*a*, and outer power roller links are generally co-planar with the other half of the links 80*b*. Again, this permits smooth and close compression of the link assemblies when the conveyor is contracted.

Figure 10A:
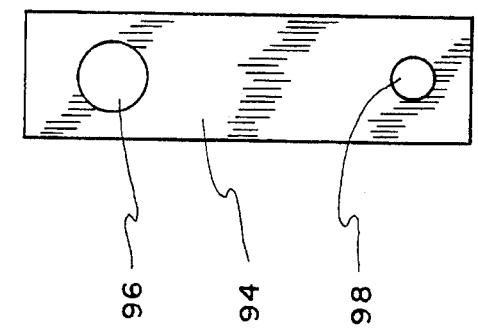
FIG. 10a is an elevation view of the support bracket for a terminal block.
Figure 10:
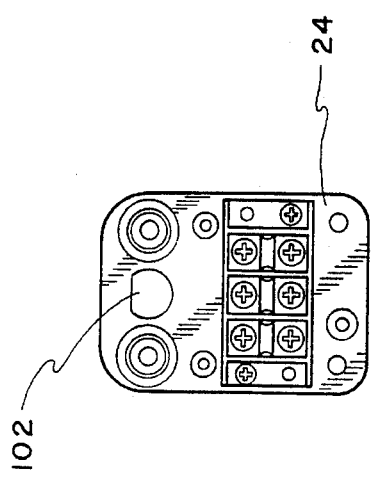
FIG. 10 is an elevation view of the terminal block.

Terminal blocks 24 for supplying power to the rollers are also mounted on the link assemblies. A terminal block 24 is mounted to each outer power roller link 38 with a support bracket 94 (FIGS. 10 and 10*a*). In accordance with this construction, the support bracket 94 is generally rectangular and includes apertures 96, 98 near each end. One end of the support bracket 94 is secured to the back of the terminal block 24 by, for example, a weld received within the aperture 96. The other end of the support bracket 94 is secured to outer power link 38 by a bolt 100 or the like that extends through the aperture 98, the hole 64 formed in the outer power roller link 38, and the elongated slot 50 formed in the inner power roller link 36 (see FIGS. 5–7).

As shown in FIGS. 1A or B, 2 and 9, the conveying surface 9 or 19 of conveyor 10 is formed by a plurality of freely-rotating skate wheels 22 mounted on rods 20 extending between the link assemblies. The rods 20 are mounted to the link assemblies at spaced locations along the length of the conveyor, so that the rods extend transversely to the length of conveying surface 19.

Figure 11:
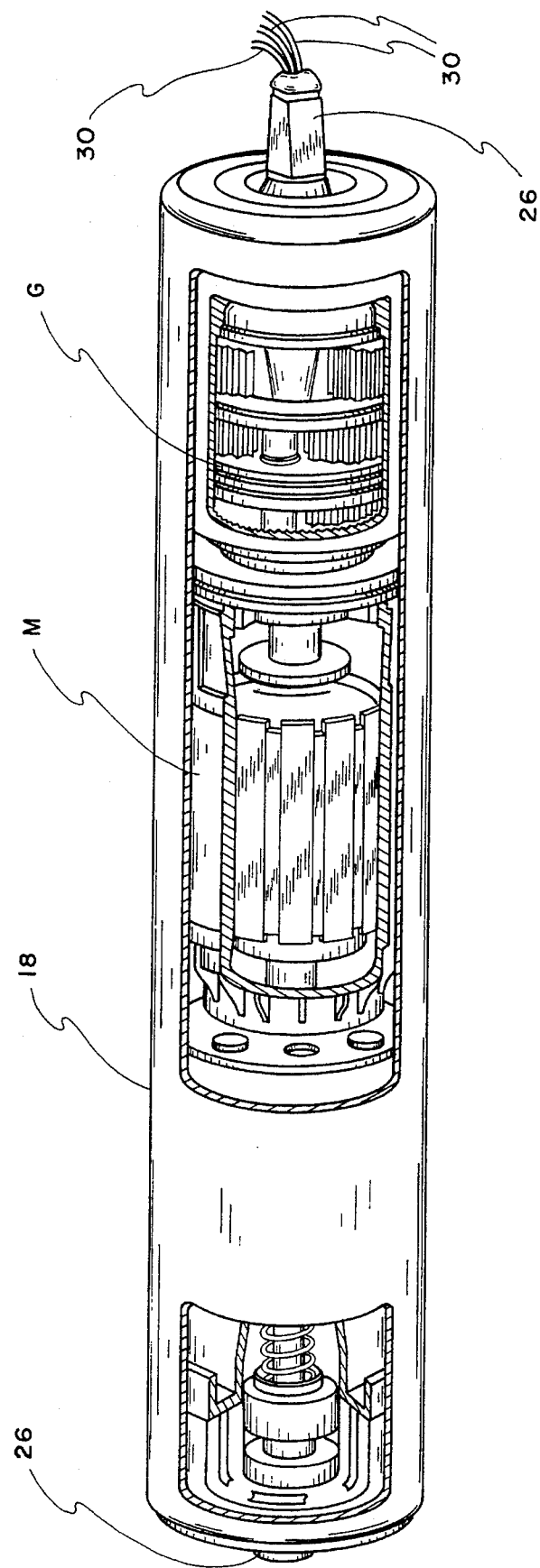
FIG. 11 is a perspective view of a powered roller cut away to show an internal motor and a gear box.

In the powered embodiment, each roller 18 (FIG. 1B) has its own internally mounted, single phase motor M and an individually associated gear box G as shown in FIG. 11. Each individual motor M is electrically connected by wires 30 to a corresponding terminal block 24 located on each outer power roller link 38. Depending on the use or application for which the conveyor is to be used, one or more of these powered rollers 18 may have different gear boxes G to accommodate higher load areas such as, for example, inclined areas. Shafts 26 extend from the ends of the powered rollers 18 for rotatably mounting the rollers on the side link assemblies 12, 14. In particular, shafts 26 of the powered roller 18 are mounted in the aperture 72 of the base 54 (FIGS. 2, 3, and 4) of the outer power roller links 38. A slot 102 (FIG. 10) is also formed in the terminal block 24 to receive the shaft 26 on one side of the power roller 18. Accordingly, the combination of one inner 36 and one outer 38 power roller link is used to mount each end of a powered roller 18 to the link assemblies 12, 14. A typical bed section includes three powered rollers.

One example of a powered roller 18 (FIG. 11) that may be utilized with the invention is the "Power Moller" roller, which is commercially available from Itah Electric Co., Ltd. 114602, Asazuma-Cho, Kasai City, Hyogo Pref. 679-01 Japan. With this product, three lead wires 30 (FIG. 8) extend from the inside of the powered roller 18 to the corresponding terminals of the terminal block 24 (FIG. 3).

The terminal blocks 24 are connected to a central power supply box 103 (FIG. 1) by a plurality of cables 104, which preferably pass through bores formed in fittings 76 (FIG. 1). Preferably, the cables 104 should have three leads, which should be connected to the corresponding powered roller terminals on terminal block 24. The cables extend from terminal block to terminal block, so that the only power connection between the powered rollers is electrical and not mechanical. Preferably, the terminals are covered by a removable cover so that the electrical connections are concealed.

The power supply box 103 contains on/off switch 110, forward/reverse switch 112, and a ground fault circuit breaker. If desired, additional on/off or forward/reverse switches may be provided at the ends of the conveyor or at locations spaced along the conveyor.

As shown in FIGS. 1A, 1B, and 2, the conveyor also includes a plurality of legs which support the conveyor on a floor or other surface. In greater detail, according to the preferred embodiment, the conveyor 1 (FIG. 1A) or 10 (FIG. 1B) is supported by a plurality of H-frame legs 120, which may be connected to the link assemblies at spaced locations along the conveyor. The legs 4–6 or 120 may be attached to casters 122, wheels, or the like. These casters may have individually associated brakes 121 which are applied or removed by a foot operated device. The legs 4–6 or 120 preferably are also vertically extendible and adjustable by means of knobs 123. The conveyor may be constructed in any width or length, and can be designed to transfer an object of virtually any weight.

Because each powered roller 18 in the embodiment of FIG. 1B has its own independent motor M (FIG. 11), the load encountered by one roller has no effect on the rotational speed of the other rollers. This prevents the transmission of power losses between the powered rollers. Additionally, the conveyor 10 does not include the pinch points present in connection with the conventional O-ring and chain drive conveyor systems, or require the high maintenance associated with the chain drive conveyor systems.

Figure 14:
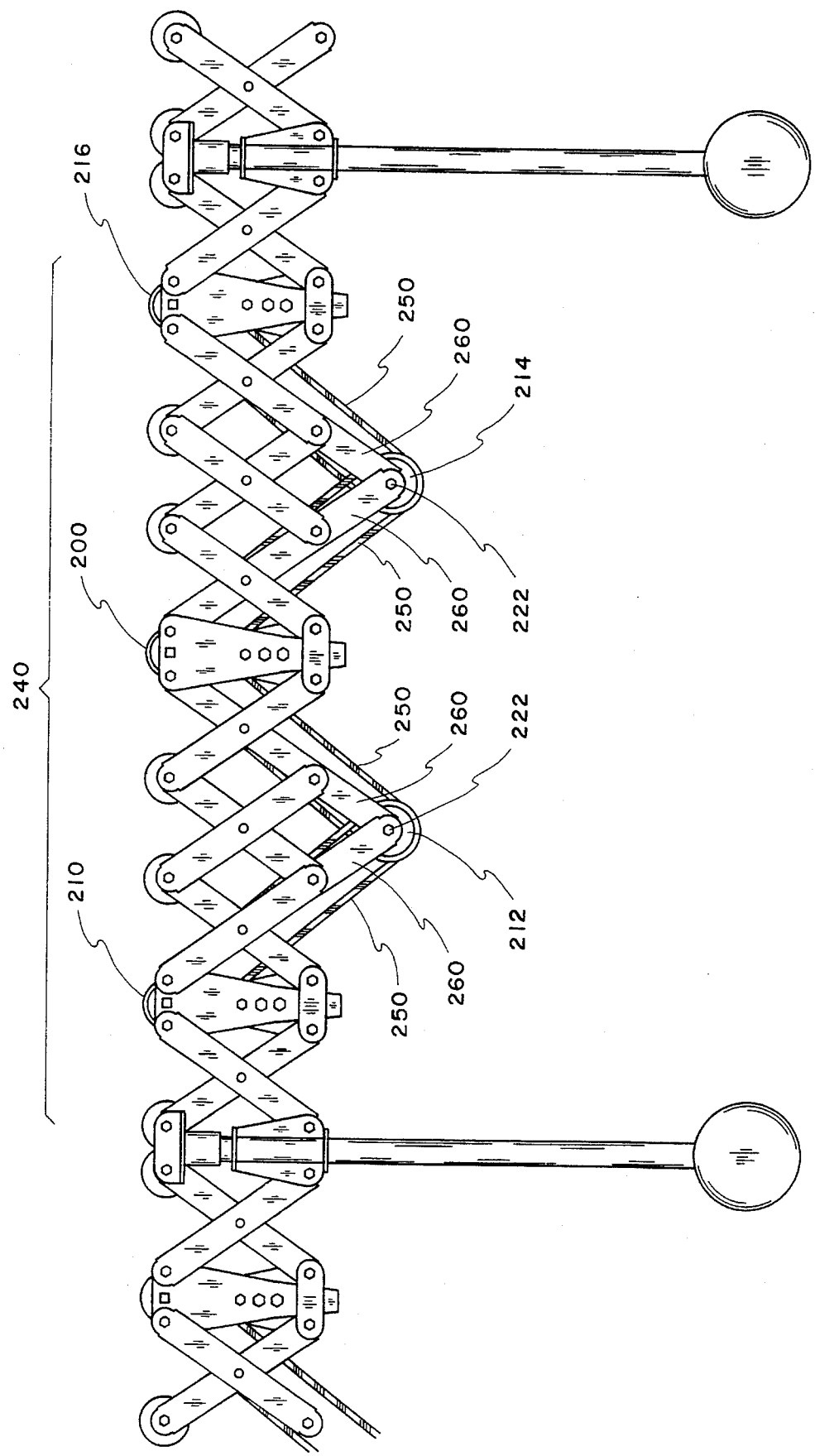
FIG. 14 is an elevation view, partly schematic, of a side link assembly with powered and driven rollers used in a second embodiment.

As shown in FIGS. 12–14, driven rollers may not have their own motor or other independent power source. The powered rollers 200 and driven rollers 210 of the second embodiment each have a pair of grooves 330 for receiving a pair of O-rings 230 or other continuous belts. The O-rings 230 drivably connect a powered roller 200 with one or more driven rollers. As shown in FIG. 14, one bed section 240 of this embodiment of the invention includes one powered roller 200 and four driven rollers 210, 212, 214, and 216, all connected to powered roller 200 by O-rings 250. Driven rollers 210 and 216 rotate along the same conveyor surface as powered roller 200, while driven rollers 212, 214 rotate below the conveyor surface. In fact, driven rollers 212, 214 are rotatably connected to the side link assemblies with a pair of full links 260 which form a "V" shape at shaft 222 of driven rollers 212, 214. In this manner, powered roller 200 transmits rotational motion to each of the driven rollers through O-rings 250. This reduces the number of powered rollers needed for the conveyor. In all other respects, the conveyor is assembled as described in connection with the first embodiment. Of course, more than one powered roller may be used in each bed section, if desired.

Figure 8:
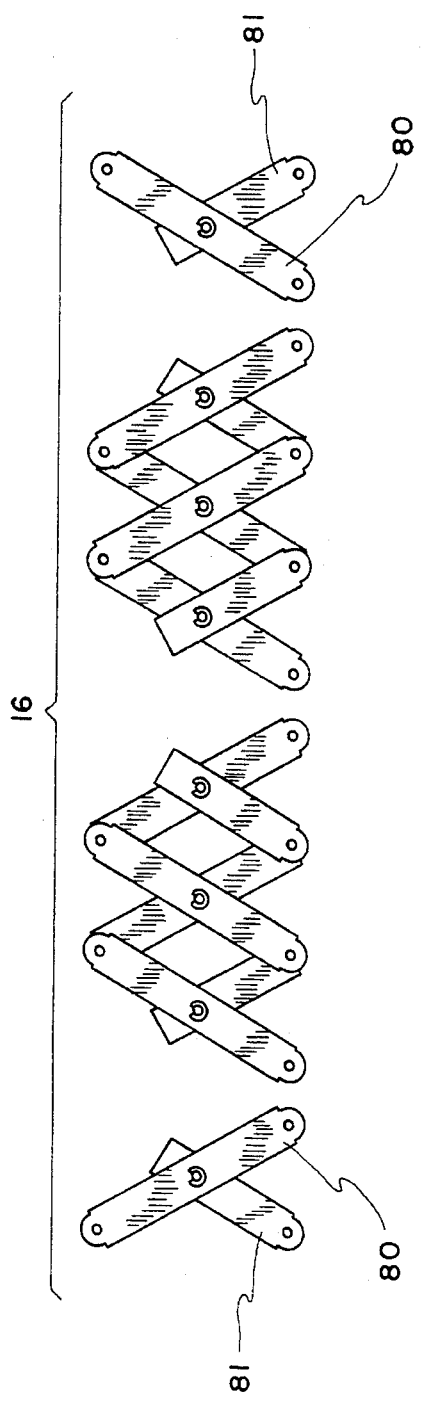
FIG. 8 is a vertical elevation of an inner link assembly.

A study of the various figures quickly reveals how and why one would want to make the conveyor in modular sections which may be joined in the field. For example, FIG. 1A shows two modules joined as one. A duplicate of the conveyor shown in FIG. 1B may be joined to the right hand end thereof. Or, as shown in FIG. 8, the sections of the links may be joined at any suitable location along the length of the conveyor. Heretofore, conveyor sections were joined by pulling a few rods from opposite ends of conveyor sections, and then, in effect, rebuilding the two conveyor sections into one conveyor section, the work being done during installation in the field. This rebuilding was both time consuming and frustrating since it is not the type of work which easily lends itself to being done in the field.

Figure 15A:
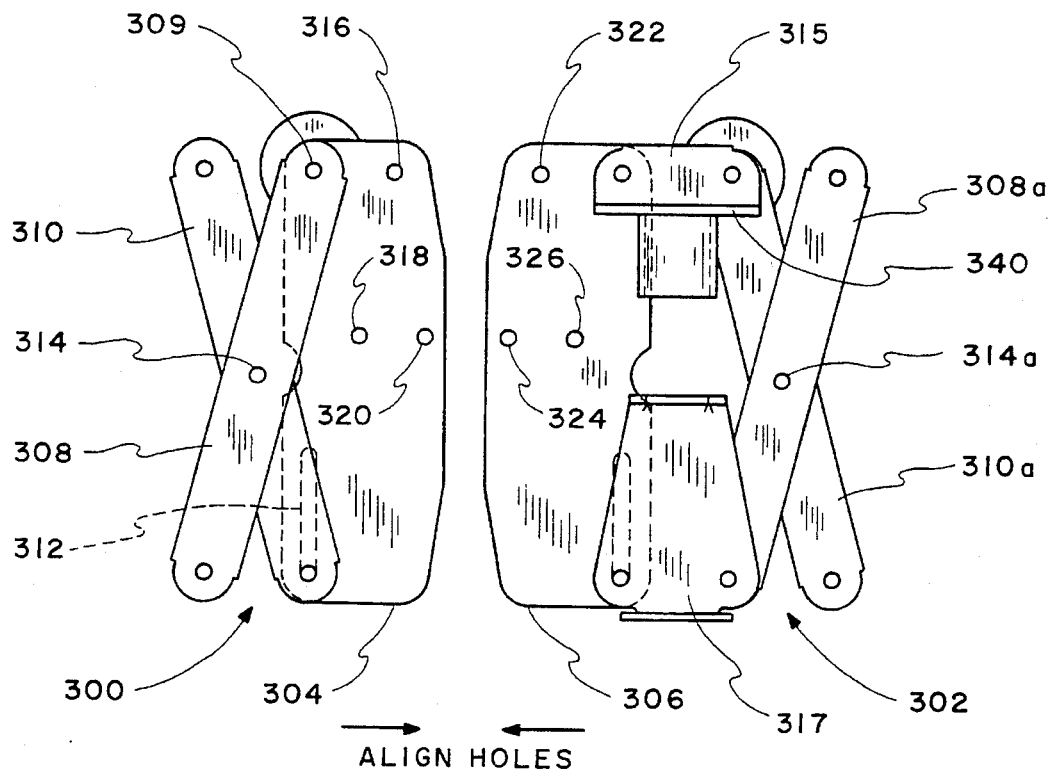
FIGS. 15A–15C are three stop motion views showing a quick connect/disconnect connector for joining two series of links, such as those shown in FIG. 8.

Accordingly, the end links 300, 302 (FIGS. 15A–15C) form a quick connect/disconnect connector for each end of an X-shaped chain, the chains being parts of different conveyor modules which are joined to each other by first overlapping and then joining end plates 304, 306, individually associated with two conveyor modules, respectively. End plates 304, 306 are identical piece parts, one being flipped over relative to the other. End plate 304 is on one end and end plate 306 is on an opposite end of a series of similarly pivoted X-shaped links. As here shown, the end plates 304, 306 are at a junction of the ends of two adjacent series of X-shaped or pivoted links individually associated with two conveyor modules.

Each end plate has one link (such as 308) pivotally joined thereto as at 309. Another and mating link (such as 310) is joined to the end plate via an elongated slot such as 312. This slot enables the X-shaped chain link on the left to expand or contract completely independent of the expansion or contraction of the X-shaped chain link on the right.

Links 308, 310 are pivotally joined together at 314. Thus, these two pivoted links, and all similar links joined to them, may come together in a compact array as the X-shape collapses to the condition seen in FIGS. 15A–15C and 18; or, they may be expanded or stretched as may be required by any given location when the X-shaped chain stretches as seen in FIGS. 3, 4. The connections to end plate 306 are a mirror image of those to end plate 304, except that spacers 315, 317 provide added space to facilitate a connection.

Figure 15B:
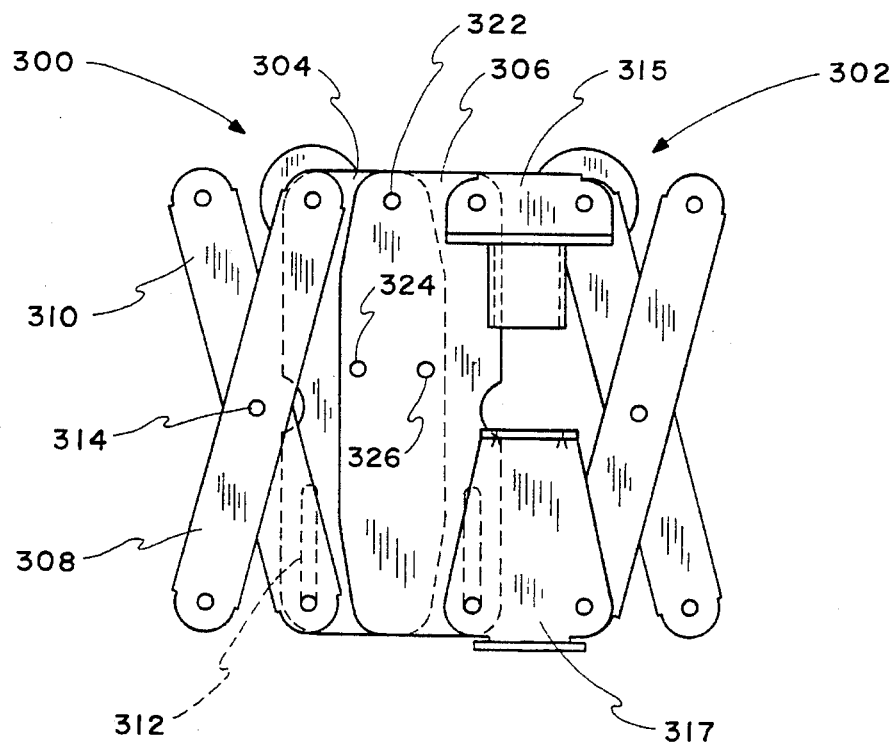

Each end plate, 304, 306 has the same pattern of bolt holes 316–326 formed therein. Thus, with end plates 304, 306 overlapped, holes 316–320 in end plate 304 may be placed over and matched with holes 322–326 in end plate 306, as shown in FIG. 15B.

New bolts may be passed into the holes 316–320 in end plate 304 and on through holes 322–326, in overlapping end plate 306, preferably with the bolts passing between the inside and the outside of the conveyor so that the threaded bolt ends are easily accessible to the workmen assembling the conveyor. Then, relatively large knurled hand knobs 330–334 (FIGS. 15C and 18) are turned onto the threaded bolt ends. Once the connection is completed on one side of the conveyor, the process is repeated on the opposite side of the conveyor.

To disconnect the conveyor modules, the process is reversed. First, knurled hand knobs 330–334 are removed. Next, the bolts are removed from bolt holes 316–326. Then, the conveyor modules are completely separated.

Figure 16:
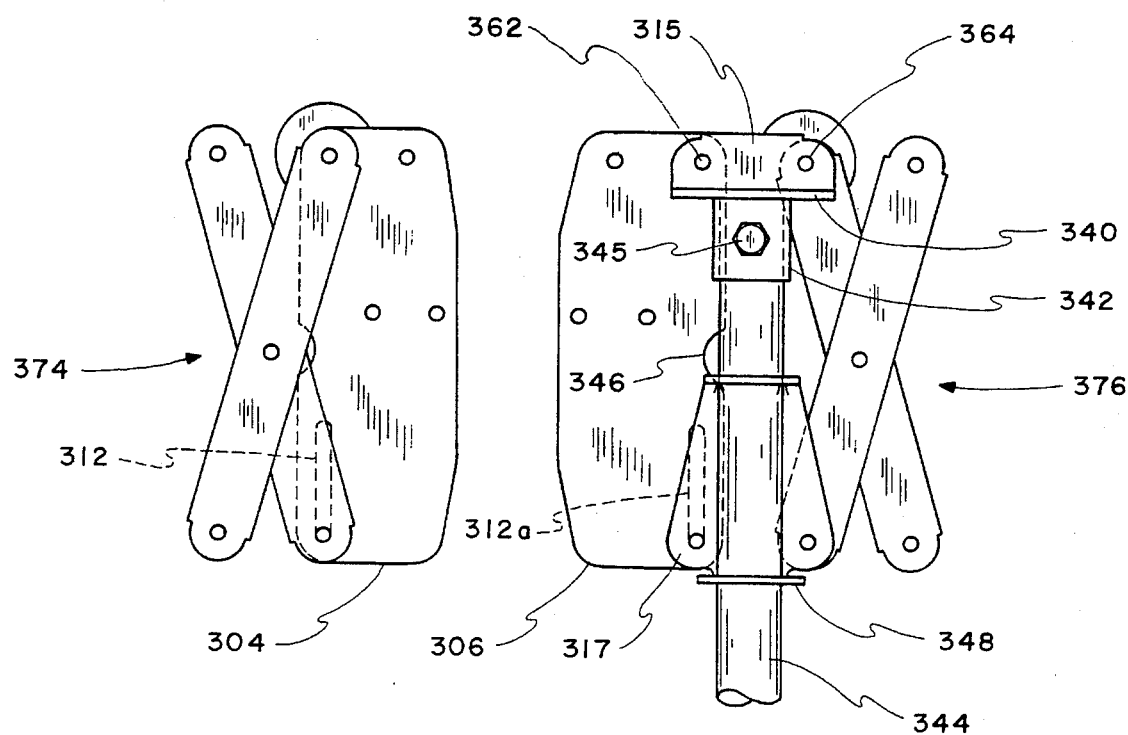
FIG. 16 is a side elevation which shows the end connectors of FIG. 15C with a supporting leg in place.
Figure 17:
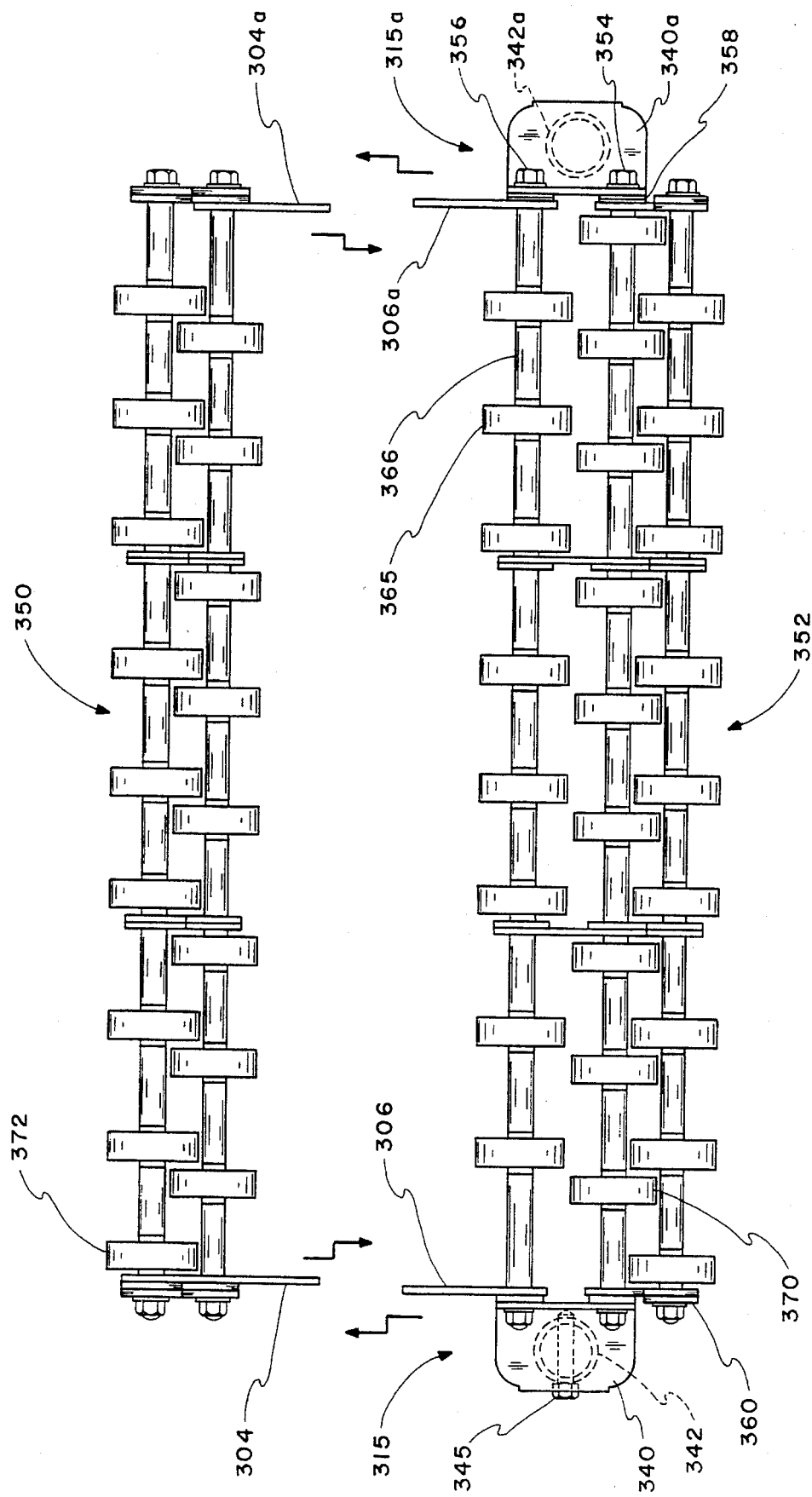
FIG. 17 is a plan view which shows a small part of an end section of two modules of the conveyor to explain how the total conveyor is put together with the help of the invention.
Figure 18:
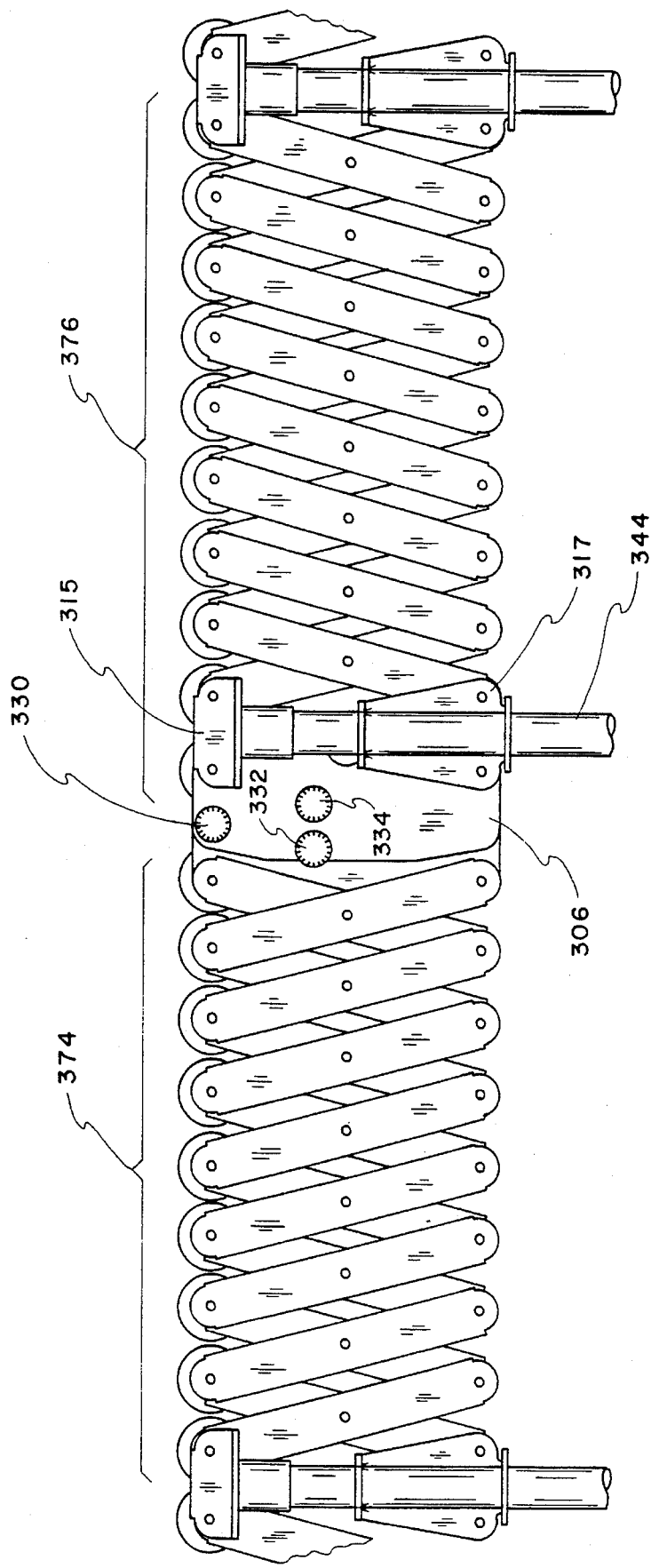
FIG. 18 is an elevation view of two modules joined by a quick connect/disconnect connector.

The two brackets or spacers 315, 317 play an important role in the modular conveyor design. As best seen in FIGS. 16, 17, and 18, the spacer 315 is an L-shaped part having a flange 340 projecting outwardly therefrom. A tube 342 is welded to the bottom of flange 340 to receive the top end of a leg 344 which supports the conveyor. The leg is secured in place by a bolt 345. A castor (not seen in FIG. 16) on the bottom of the leg 344 may be locked in place by a foot pedal 121 (FIG. 1).

The spacer 317 has two projecting flanges 346, 348 having holes therein through which the leg 344 may slide. As the X-shaped chain expands or contracts, these flanges 346, 348 slide up and down the leg 344. The limit of such sliding motion and, therefore, of conveyor expansion, occurs when the upper flange 346 abuts against the bottom of the tube 342.

Figure 15C:
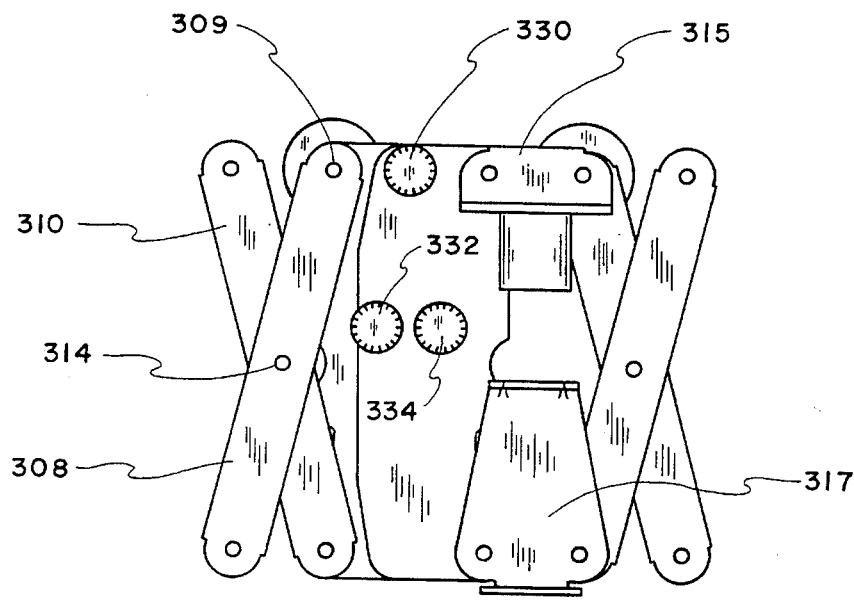

The conveyors 350, 352 (FIG. 17) are ends of two modules which are joined together by overlapping end plates 304, 306 and 304a, 306a (as shown in FIG. 15C). The conveyors are made of long bolts, perhaps 2–2.5 feet long, such as 354, 356 which extend across the width of the conveyor from one X-shaped chain 358 to the spaced parallel X-shaped chain 360. The bolts 354, 356 are first threaded through holes, such as 362, 364 (FIG. 16) in spacer 315a (FIG. 17). Then the long bolts 354, 356, etc. are threaded through spacers (such as 366) and skate wheels (such as 368) to form a field of skate wheels arranged in a pattern best suited to the needs of the particular conveyor.

It should now be apparent that the structure shown in FIGS. 15–17 may be completely assembled in a factory. In the field, it is only necessary to overlap end connector plates 304, 306 (304a, 306a) and insert three bolts through the overlapped plates.

Also, the end plates 304, 306 have individually associated slots 312, 312a. This means that the X-shaped chain 374 (FIGS. 16, 18) may expand or contract independently of the X-shaped chain 376. Therefore, if a castor (not shown in FIGS. 16, 18) is locked on the bottom of leg 344, the X-shaped chain 374 may be pushed into or out of the back of a truck, for example, without producing any effect upon the X-shaped chain 376.

The foregoing description is for purposes of illustration only and is not intended to limit the scope of protection accorded this invention. The scope of protection is to be measured by the following claims, which should be interpreted to cover all equivalent structures and as broadly as the inventive contribution permits.

The invention claimed is:

1. A flexible conveyor for transporting objects, said conveyor comprising:

a plurality of conveyor modules, each having at least two spaced parallel flexible side link assemblies, each of said side link assemblies comprising a plurality of links pivotally connected to each other in an X-shaped chain configuration;

a quick connect/disconnect connector on at least one end of each of said flexible link assemblies, said connectors joining said plurality of conveyor modules into a single operative unit so that each of said flexible link assemblies may expand or contract independently of the other flexible link assemblies; and a plurality of rods each having a plurality of freely rotating skate wheels mounted thereon, said rods interconnecting said side link assemblies.

2. The conveyor of claim 1 wherein each of said connectors comprises an end plate having a first of said links pivotally connected thereto and a second of said links slidingly joined thereto, said first and second of said links being pivotally joined near their centers, and a mating fastener on each of said end plate whereby two end plates may be joined in order to join side link assemblies on different modules.

3. The conveyor of claim 1 wherein each of said connectors comprises an end plate, said end plate having a pivot point at one end and a slot at the opposite end, an X-shaped link chain pivotally connected to said pivot point and slidably connected to said slot whereby said X-shaped chains connected to individually associated ones of said end plates may expand or contract independently of each other.

4. The conveyor of claim 3 and a pair of spacers interposed between one of said end plates and an X-shaped link chain connected thereto, one of said spacers including a flange for receiving and connecting to a leg which supports the conveyor.

5. The conveyor of claim 4 wherein the other of said spacers between said X-shaped link chain and said one of said end plates has two flanges with holes through which said leg may fit, said two flanges sliding up and down said leg as said X-shaped chain expands or contracts.

6. The conveyor claim 3 and a roller housing said motor and an individually associated gear box means housed within said roller for driving at least some of said skate wheels.

7. The conveyor of claim 3 wherein each of the flexible link assemblies further comprises inner and outer power roller links for mounting an end of each spaced roller having a motor onto the flexible link assemblies.

8. A flexible conveyor for transporting objects, said conveyer comprising:

a plurality of pairs of spaced parallel flexible link assemblies, each flexible link assembly comprising a plurality of links pivotally connected to each other in order to form an X-shaped chain;

each of said chain assemblies of links ending in and being attached to an end plate having at least two bolt holes therein for joining an overlapping pair of end plates, a knurled hand knob for attachment to each of said bolts for clamping said end plates together, said end plates including a sliding connection for enabling the attached X-shaped chain to expand or contract independently of X-shaped chains in other of said assemblies;

a field comprising a plurality of spaced wheels mounted on rods interconnecting the spaced parallel link assemblies;

means for mounting an end of each of said rods onto the flexible link assemblies.

* * * * *